US009448637B2

(12) United States Patent
Avrahami

(10) Patent No.: US 9,448,637 B2
(45) Date of Patent: Sep. 20, 2016

(54) DETECTION OF AND RESPONSE TO EXTRA-DEVICE TOUCH EVENTS

(71) Applicant: Intel Corporation, Santa Clara, CA (US)

(72) Inventor: Daniel Avrahami, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 48 days.

(21) Appl. No.: 13/874,905

(22) Filed: May 1, 2013

(65) Prior Publication Data

US 2014/0327655 A1 Nov. 6, 2014

(51) Int. Cl.
*G06F 3/01* (2006.01)
*G06F 1/16* (2006.01)

(52) U.S. Cl.
CPC ............ *G06F 3/017* (2013.01); *G06F 1/1694* (2013.01)

(58) Field of Classification Search
CPC ........ G06F 1/1673; G06F 3/01; G06F 3/011; G06F 3/0425; G06F 3/0426; G06F 3/0428; G06F 3/048; G06F 3/0481; G06F 3/04812; G06F 3/04815; G06F 3/04817; G06F 3/0484; G06F 3/0487
See application file for complete search history.

(56) References Cited

U.S. PATENT DOCUMENTS

| 8,624,836 | B1* | 1/2014 | Miller et al. ................... 345/157 |
| 2007/0078919 | A1 | 4/2007 | Westerman et al. |
| 2007/0254271 | A1* | 11/2007 | Burlik ................ A63B 71/0622 434/247 |
| 2009/0083847 | A1* | 3/2009 | Fadell .................... G06F 21/316 726/16 |
| 2011/0154233 | A1* | 6/2011 | Lamarca et al. .............. 715/764 |
| 2011/0248918 | A1 | 10/2011 | Yoo et al. |
| 2011/0312349 | A1 | 12/2011 | Forutanpour et al. |
| 2012/0052944 | A1* | 3/2012 | Saddler ................. A63F 9/0096 463/31 |
| 2014/0168356 | A1* | 6/2014 | Francois ............ H04N 5/23238 348/37 |

FOREIGN PATENT DOCUMENTS

KR 10-2008-0091502 A 10/2008
KR 10-2011-0032210 A 3/2011

OTHER PUBLICATIONS

Kane et al., "Bonfire: A Nomadic System for Hybrid Laptop-Tabletop Interaction", UIST '09 Proceedings of the 22nd annual ACM symposium on User interface software and technology, Oct. 4-7, 2009, pp. 129-138.*

(Continued)

*Primary Examiner* — Larry Sternbane
(74) *Attorney, Agent, or Firm* — Barnes & Thornburg LLP

(57) ABSTRACT

Technologies for detection of and response to extra-device touch events may include mobile device sensors, such as accelerometers, that detect that a touch event has taken place by detecting device movement in response to the touch event. In some embodiments, a touch event feature vector is generated from sensor readings and passed to a classifier that determines the touch event location. Other touch event information, such as timing, intensity and a profile of the object that caused the touch event can also be determined. The detecting and locating of touch events allows the interaction area of a mobile device to be extended beyond the physical bounds of the device, and allows multiple users to simultaneously use a mobile device in a more convenient manner. Applications executing on a mobile device or the device's operating system can take various actions based on the touch event's location.

25 Claims, 7 Drawing Sheets

(56) References Cited

OTHER PUBLICATIONS

Marquardt et al., "(sp)iPhone: Decoding Vibrations From Nearby Keyboards Using Mobile Phone Accelerometers", CCS '11 Proceedings of the 18th ACM conference on Computer and communications security, Oct. 17-21, 2011, pp. 551-562.

Butler et al., "SideSight: Multi-"touch" interaction around small devices", Microsoft Research, UIST '08 Proceedings of the 21st annual ACM symposium on User interface software and technology, 2008, pp. 201-204.

Harrison et al., "Scratch Input: Creating Large, Inexpensive, Unpowered and Mobile Finger Input Surfaces", UIST '08 Proceedings of the 21st annual ACM symposium on User interface software and technology, Oct. 19-22, 2008, pp. 205-208.

International Search Report and Written Opinion for Application No. PCT/US2014/034809, dated Aug. 7, 2014, 14 pages.

\* cited by examiner

```
┌─────────────────────────────────────────────────────────────────┐
│ DETERMINE LOCATION OF EXTRA-DEVICE TOUCH EVENT OCCURRING IN THE │
│   PROXIMITY OF A MOBILE DEVICE BASED ON MOVEMENT OF THE MOBILE  │
│     DEVICE AS DETECTED BY MOBILE DEVICE SENSORS            510  │
└─────────────────────────────────────────────────────────────────┘
                                 │
                                 ▼
┌─────────────────────────────────────────────────────────────────┐
│         DETERMINE AN ACTION TO PERFORM BASED ON TOUCH EVENT LOCATION │
│                                                            520  │
└─────────────────────────────────────────────────────────────────┘
                                 │
                                 ▼
┌─────────────────────────────────────────────────────────────────┐
│              PERFORM THE ACTION AT THE MOBILE DEVICE            │
│                                                            530  │
└─────────────────────────────────────────────────────────────────┘
```

FIG. 5

DETECTION OF AND RESPONSE TO EXTRA-DEVICE TOUCH EVENTS

BACKGROUND

The size of the interaction space of most current mobile devices is limited. For current tablet computers and smartphones, the interaction space is typically restricted to their touch-screens and control buttons.

BRIEF DESCRIPTION OF THE DRAWINGS

FIG. 5 is a flowchart of an exemplary method of determining the location of an extra-device touch event at a mobile device and performing an action.

DETAILED DESCRIPTION

Figure 1:
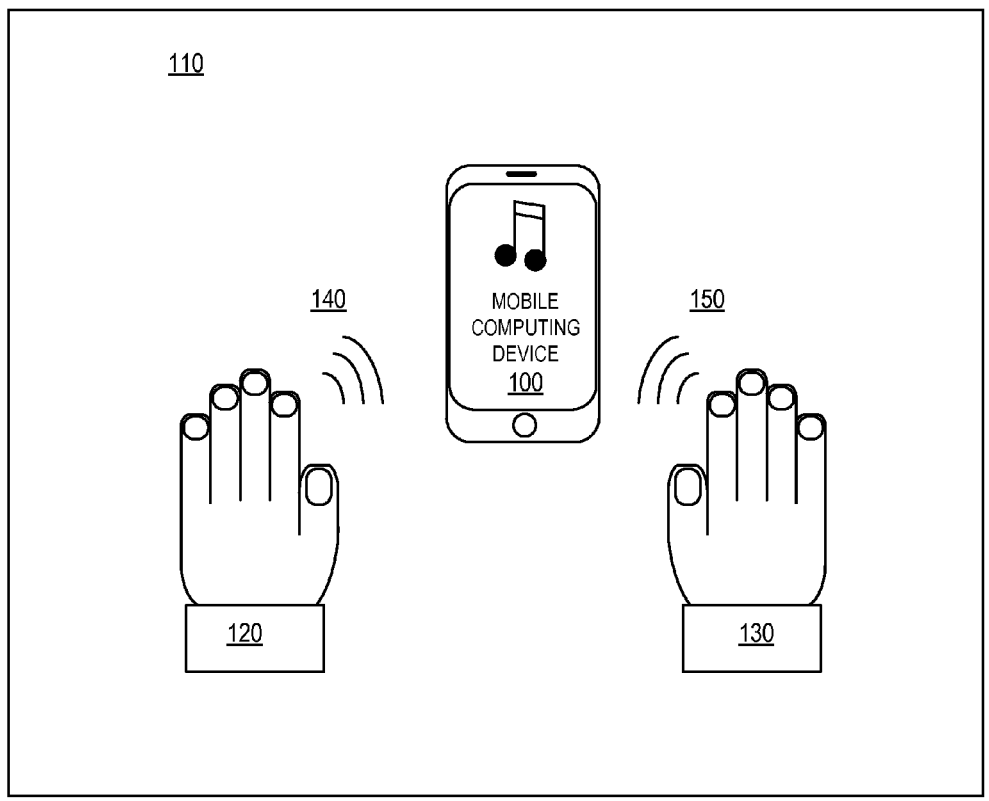
FIG. 1 shows an exemplary mobile device that can detect extra-device touch events and that can perform different actions depending on the location of the touch events.

The technologies disclosed herein extend the interaction space of a mobile computing device beyond the physical boundaries of the device. Sensors built into the device detect movement of the device in response to extra-device touch events, touch events that occur near the device, on the surface on which the device is resting. The detected movement can be used to determine the location of the touch event, at least to a coarse degree. For example, a mobile phone can utilize a built-in accelerometer to detect the tap of a user's finger on the surface surrounding the phone, determine the location of the tap and perform an action depending on where the tap occurred.

Extending the interaction space of a device allows users to interact with the device with their whole hand or both hands, instead of just with one or a few fingers (that typically only interact with a touch screen or control buttons). For instance, a music application executing on a mobile phone can play percussion instrument sounds in response to a user drumming his hands on the surface surrounding the device. The application can play different sounds depending on where the user hits his or her hand. An extended interaction space also allows more users to simultaneously interact with a single device, or at least allow multiple users to simultaneously interact more conveniently with a single device. For example, consider a trivia game executing on a tablet computer that can detect which of several users is to be given the opportunity to answer a question based on which user tapped their hand on the surface adjacent to the tablet. It is likely more convenient for the users to interact with such a game than if they had to crowd around the tablet to buzz in by interacting with the tablet's touch screen.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives within the scope of the claims.

As used herein, the terms "touch event" and "extra-space touch event" refer to an interaction of an object with a surface on which a mobile device is located within the proximity of the device. The object can be, for example, a user's finger or whole hand, pencil, drumstick or stylus; and the surface can be, for example, a countertop, a table or a floor. Thus, a touch event can be any of a wide variety of interactions, such as a finger or pencil being tapped on a table or an open palm being struck on a countertop. A touch event occurs in the proximity of a mobile device if the device's sensors can detect the touch event. That is, the touch event is within the proximity of a mobile device if the touch event causes detectable movement of the device. Accordingly, the proximity of the mobile device can vary depending on various factors, such as the material of the platform on which the device is resting, the object used to create the touch event, the intensity with which the object strikes the surface, and sensitivity of the mobile sensors.

FIG. 1 shows an exemplary mobile device 100 that can detect extra-device touch events and that can perform different actions depending on the location of the touch events. The mobile computing device (mobile device) 100 can be any type of mobile device described herein, such as a mobile phone (as shown), tablet or laptop computer. The mobile device 100 is resting on a surface 110 of a platform and is executing an electronic drum application that plays sounds of various percussion instruments in response to a user hitting the surface in the proximity of the device. When a user's hand 120 or 130 hits the surface 110, vibrations 140 and 150 are created that cause movement of the device 100 that is detected by the device's built-in sensors.

The sensors generate output that indicates movement of the mobile device. Typically, the sensors comprise an accelerometer that generates output reflecting acceleration of the device in one or more planes (e.g., X, Y and Z planes). In some embodiments, a mobile device can comprise more than one accelerometer to detect the touch events. In still other embodiments, a gyroscope can be used in conjunction with one or more accelerometers to detect touch events. In some embodiments, a gyroscope provides output indicating angular orientation of a device around one or more axes (e.g., X, Y and Z-axes), enabling measurement of a device's yaw, pitch and roll.

The mobile device 100 can perform different actions depending on the location of a detected touch event. For example, the mobile device 100 can play different sounds depending on where the user strikes the nearby surrounding surface. For instance, if a hand strike on the surface 110 causes bongo sounds to be played, the mobile device 100 can partition the surrounding area into multiple regions and play a different bongo sound depending upon where a hand strike has occurred. In another embodiment, the sounds of different percussion instruments can be played depending on touch event location. For example, the device 100 can be programmed such that in response to a user's left hand hitting the surface to the left of the device, a snare drum sound may be played and if the user's right hand hits the surface to the right of the device, a floor tom-tom noise could be played. The area around the mobile device 100 can be partitioned into any number of partitions, and the individual partitions can take any shape, as long as the mobile device is capable of distinguishing between touch events occurring within separate partitions. For instance, a partition scheme with more than two partitions could allow a user to pretend he or she playing a full drum kit, with high-hat cymbal, crash cymbal, snare drum, various toms and bass drum sounds being played depending on where the user hits his or her hands on the surface 110.

The determined location of a touch event can comprise, for example, a direction relative to the mobile device, and/or a distance from the mobile device. For example, the direction can indicate that the touch event has occurred closest to a particular edge of a mobile device (e.g., top, bottom, left, right) or at a particular angular coordinate. For instance, with reference to FIG. 1, the direction of the hand 120 could be determined to be in the left half or lower-left quadrant of the surrounding area, at the 7 o'clock position, or at 200 degrees within an angular coordinate system. The direction of the hand 130 could be determined to be in the right half, lower-right quadrant, 4 o'clock position, or at 315 degrees. Thus, in some embodiments, the direction can be based at least in part on how the device has partitioned its surrounding area.

Figure 2:
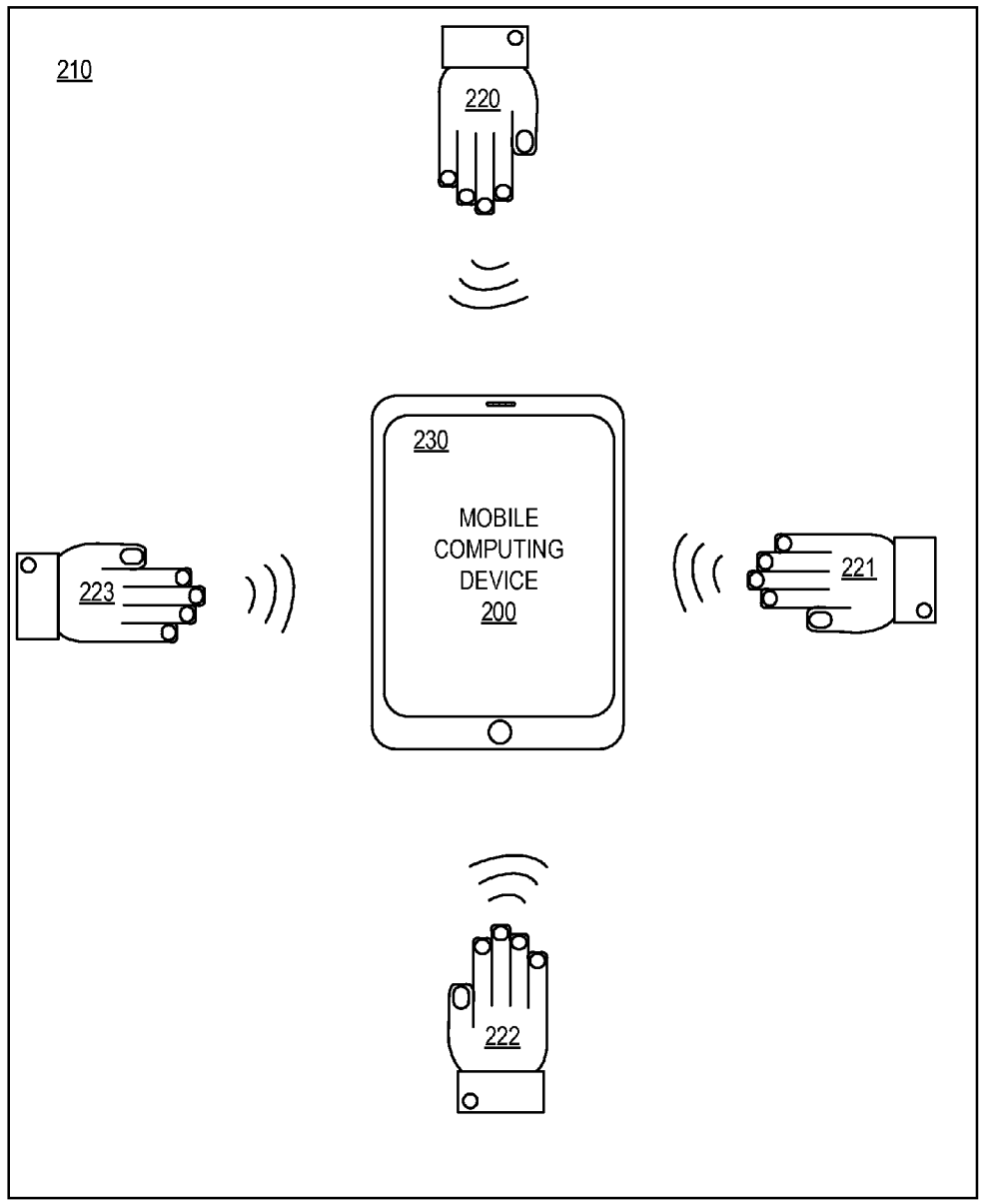
FIG. 2 shows an exemplary mobile device that can detect extra-device touch events and that can perform different actions depending on the location and timing of the touch events.

FIG. 2 shows an exemplary mobile device 200 that can detect extra-device touch events and that can perform different actions depending on the location and timing of the touch events. The computing device 200, may be a tablet computer or any other mobile device described herein, is executing a trivia game application in which the first user who hits the surface 210 with their hand (e.g., hand 220, 221, 222 or 223) is given the opportunity to answer the question. By extending the interaction surface beyond the touchscreen 230 of the mobile device 200, it is possible to increase the number of players that can play a multi-player game on a mobile device or at least make it more convenient for multiple users to play the game. By being able to interact with the device 200 by simply hitting the surface 210 near the device, multiple users do not need to crowd around the touchscreen 230 to play the game.

Figure 3:
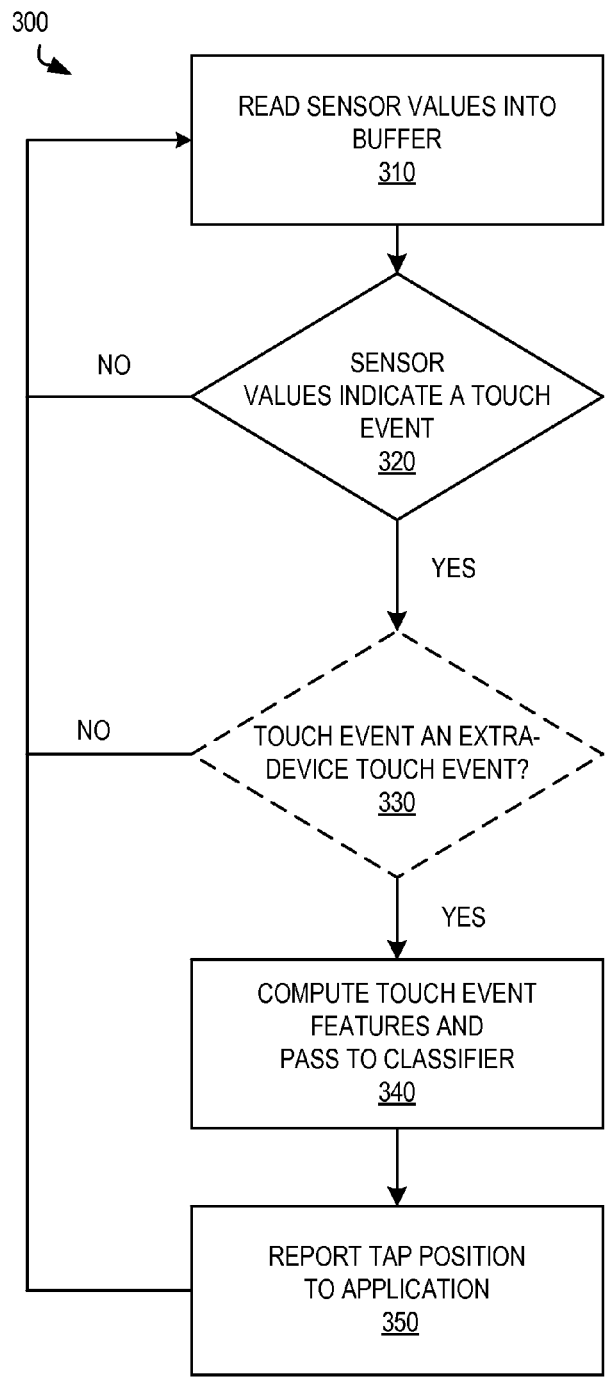
FIG. 3 is a flowchart of an exemplary method of detecting extra-device touch events and determining their location.

FIG. 3 is a flowchart of an exemplary method 300 of detecting extra-device touch events and determining their location. The method 300 can operate at any level of a mobile device, such as at a software application level or an operating system level. Typically, the method 300 is performed at an operating system level, and communicates with software applications and/or operating system components.

At process act 310, sensor values are read into a buffer (or other memory structure or component) of the device. Although the method 300 shows sensor values as continually being read, as indicated by the paths in the flowchart ultimately returning to 300, sensor values can be read synchronously, asynchronous, or continually only if the reading of sensor values is enabled by an application or operating system component. One or more recent sensor values can be stored in the buffer, and the sensor values can comprise values indicating the acceleration of the device in one or more planes or acceleration of the device about one or more axes.

At process act 320, it is determined whether the sensor values indicate the occurrence of a touch event. Various approaches can be used in determining whether the sensor values indicate a touch event. For example, in some embodiments, the sensor values can be compared against a touch event threshold, with a touch event being indicated by one or more accelerometer readings exceeding the threshold. In embodiments where the sensor values comprise values for a plurality of acceleration planes or for a plurality of sensors, sensor readings from fewer than all planes and/or for fewer than all sensors can be used to determine the presence of a touch event.

If the sensor values indicate a touch event, it is determined whether the touch event is an extra-device touch event at process act 330. If not, the method returns to 310 and new sensor values are read. Determining whether the touch event is an extra-device touch event can comprise determining if the user has supplied input to the device via direct physical contact with the device, such as via interaction with the touch screen or pressing a control button. If the touch event is determined to be an extra-device touch event, then the method 300 computes a feature vector of the touch event and passes the feature vector to a classifier at process act 340. If the touch event is determined to not be an extra-device touch event, the method 300 returns to 310 and new sensor values are read. In some embodiments of the method 300, the process act 330 is left out and the method 300 proceeds from 320 to 340 if the sensor values indicate the presence of a touch event. Process act 330 can be left out in situations where, for example, user input is not expected to be supplied directly to the mobile device.

At process act 340, a vector comprising one or more touch events features is determined from the sensor values. A touch event feature vector can comprise, for example, frequency-domain information obtained by performing a Fourier transform (such as a Fast Fourier Transform) on the sensor values, minimum and maximum values and the like. A touch event feature vector can comprise time-domain, frequency-domain, other types of information or any combination thereof.

Once determined, the touch event feature vector is passed to a classifier. In some embodiments, the classifier is trained using machine learning principles, wherein a set of training examples (or vectors) are supplied to the classifier to train the classifier to be able to determine a location for a touch event. In some embodiments, the classifier is a k-Nearest Neighbor (kNN) classifier. In a kNN classifier, given an input touch event feature vector, which represents a query point, k examples in the training data are found that are closest in distance to the query point. The input feature vector is then assigned a class based on a majority vote among the k examples. The class is the determined touch event location. In some embodiments, if an appropriate training set has been supplied to the classifier, classification of the touch event feature vector can determine multiple simultaneous tap locations provided by multiple users.

Classifiers can be created using various approaches. A classifier is created by providing the mobile device with a set training examples of known touch events, which is referred to as training the classifier. Training sets can be created in various ways. In one embodiment, a mobile device is placed on a surface and a training application is launched. The application provides instructions to the user on what touch events the user is to create on the surface surrounding the phone. Training examples can comprise touch events that occur at different locations surrounding the mobile device, touch events that have intensities, touch events created using various objects (e.g., pencil, stylus) or part of a user's hand (e.g., single, multiple finger, fist, open hand), touch events supplied directly to a mobile device (e.g., to a touch screen or a control button), touch events applied to various platforms (e.g., wood, granite) and multiple touch events that occur simultaneously.

In some embodiments, a classifier can be retrained to allow the mobile device to more reliably detect touch events when the device is moved to a different surface. For example, a user striking his or her hand on a wooden tabletop typically causes different accelerometer readings at a mobile device than a user striking his or her hand on a rug. A device can prompt a user to provide a set of training examples for retraining the classifier when, for example, the device detects that it has been moved to a new surface, when an application utilizing touch event locations is launched, or at the user's request.

At process act 350, the position of the touch event (or touch events), as determined by the classifier, is passed to an application or an operating system component.

In some embodiments, a device can determine the intensity of a touch event, reflecting, for example, how hard a user hits the surface near the device with an object or body part. In such embodiments, an application (or operating system) can perform an action that depends at least in part on the touch event intensity. Or, the characteristic of an action taken by the application can depend on the touch event intensity. For example, in the musical application example, the volume at which an instrument sound is played can be based in part on the touch event intensity. In another example, in a gaming application, the intensity with which a user strikes the surface can cause a game character to take a different action (e.g., the character can jump if the intensity is below a certain threshold and take off in flight if the intensity is above the threshold).

In some embodiments, the device can determine a profile of the object that created the touch event. The profile can distinguish between various objects used to create touch events in the set of training example. In such embodiments, an application (or operating system) can perform an action that depends at least in part on the object profile. Or, the characteristic of an action taken by the application can depend on the object profile. For example, returning to the musical application example, a user tapping the surface with a single finger can cause the application to play a different tone or sound for a percussion instrument, such as a bongo, than if the user strikes the surface with his open palm. Similarly, if the classifier can distinguish between a user's hand or a drumstick (or a pencil, pen or stylus), the musical application can cause a different instrument to be played, such as a snare or a tom being played if a touch event is caused by a drumstick, pencil, pen or stylus, and playing a bongo if the touch event is caused by a user's hand or finger touching the surface.

In some embodiments, the touch event location is determined with a coarse degree of accuracy. For example, in the trivia game application embodiment described previously, if four players are playing the game, the mobile device need only be able to determine in which quadrant of the surface surrounding the device a touch event is located. Thus, in embodiments where only a coarse degree is needed, fewer training examples may be supplied to the mobile device to train a classifier. In embodiments where a finer degree of accuracy in the touch location is required, a larger set of training examples can be provided to a mobile device for classifier training.

In some embodiments, the technologies herein can determine timing information for a touch event. Timing information can comprise any type of timing information, such as an absolute time (e.g., date, hour, minute, second), a time relative to another touch event or a device or application event (e.g., in a trivia game, the time since the last question was presented).

The technologies described herein can also determine timing information for multiple, overlapping touch events. That is, touch events that occur close enough in time that an accelerometer may still be exhibiting a response to a prior touch event when it begins to respond to a subsequent touch event. In some embodiments, the time that a first touch event occurs in a series of multiple overlapping touch events can be determined to be the time at which the sensor readings first exceed a touch event threshold. Since sensor readings of a touch event typically fall quickly below the touch event threshold, the time at which a second touch event that overlaps with the first touch event occurs can be the time at which sensor readings next exceed the touch event threshold.

Figure 4:
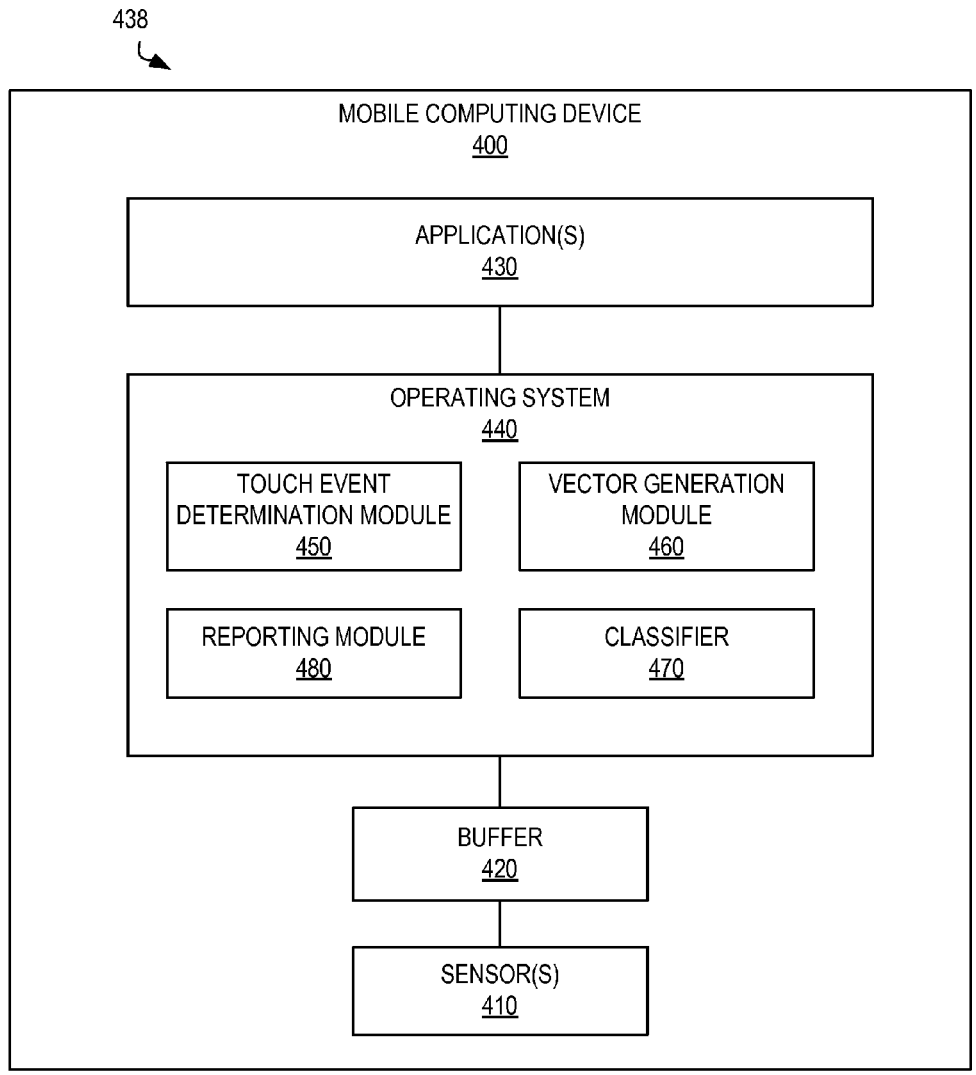
FIG. 4 is a block diagram of an exemplary computing device that can determine the location of an extra-device touch event.

FIG. 4 is a block diagram of an exemplary computing device 400 that can determine the location of an extra-device touch event. The computing device 400 comprises one or more sensors 410, a buffer 420, one or more applications 430 and an operating system 440. The one or more applications 430 and the operating system 440 operating on the computing device 400. The one or more sensors 410 can comprise one or more accelerometers, gyroscopes or other sensors that can detect device movement. The buffer 420 stores values generated by the sensor(s) 410. In other embodiments, sensor values can be stored in any other memory structure within or accessible to the mobile device 400, such as cache memory. The applications 430 can comprise one or more applications that utilize touch event locations.

The operating system 440 comprises a touch event determination module 450, a vector generation module 460, a classifier 470 and a reporting module 480. The touch event determination module 450 evaluates sensor values stored in the buffer 420 to determine whether there has been a touch event in the proximity of the computing device. The vector generation module 460 generates a touch event feature vector for a set of sensor values. The vector can comprise features of the sensor values such as minimum, maximum, median and average sensor values over a particular window, as well as frequency-domain information. The classifier 470 can be used to determine the location of a touch event from the touch event feature vector. For example, the classifier can be a kNN classifier that determines a touch event location based on the location associated with the top N examples in the training class that most closely match a supplied touch event feature vector. The classifier 470 can be trained by a set of training examples provided by a component of the operating system 440 and/or an application 430. The reporting module 480 can report information about a touch event, such as touch event location, timing information, intensity, profile of the objet used to create the touch event, to an application 430 or to other components of the operating system 440.

It is to be understood that FIG. 4 illustrates one example of a set of modules and components that can be included in a mobile computing device. In other embodiments, a mobile device can have more or fewer modules or components than those shown in FIG. 4. For instance, a mobile device could comprise a plurality of classifiers corresponding to different types of surfaces (e.g., wood, granite). In some embodiments, a mobile device comprising multiple classifiers corresponding to different surface types can comprise a module that automatically selects the classifier. For example, the device could select a classifier by analyzing images taken by a built-in camera to determine the type of surface. In another example, the device 600 can select a classifier by instructing the user to perform one or more specific taps on the table, comparing the training touch event features vectors produced by the taps to training vectors corresponding to different stored classifiers. In such embodiments, a mobile device 600 may not need to collect a set of new training examples when it is moved to a different type of surface.

Further, modules shown as being separate in FIG. 4 can be combined into a single module, or a single module shown in FIG. 4 can be split into multiple modules. Moreover, any of the modules shown in FIG. 4 as being in the operating system of the computing device 400, can operate at another software layer, such as an application layer. Further, the modules shown in FIG. 4 can be implemented in software, hardware, firmware or combinations thereof. A computing device referred to as being programmed to perform a method can be programmed to perform the method via software, hardware, firmware or combinations thereof.

FIG. 5 is a flowchart of an exemplary method 500 of determining the location of an extra-device touch event at a mobile device and performing an action. The method 500 can be performed by, for example, a tablet computer executing a trivia game being played by four players. Players have to hit the region of the surface near the tablet that is assigned to them in order to "buzz in" to answer a question. The tablet utilizes an accelerometer to detect movement of the tablet.

At process act 510, a location of an extra-device touch event occurring in the proximity of a mobile device is determined based on movement of the mobile device as detected by one or more mobile device sensors. The location comprises a direction relative to the mobile device. In the example, a question is asked to which only player #3 knows the answer. Player #3 strikes the surface of the table assigned to him after the question is read. The tablet accelerometer detects movement of the tablet in response to the player's hand striking the table, and determines that the location of the touch event occurred in the region of device proximity assigned to player #3.

At process act 520, an action to perform at the mobile device is determined based at least in part on the location. In the example, the tablet determines that player #3 is to be given an opportunity to respond to the question.

At process act 530, the action is performed at the mobile device. In the example, the tablet computer queries player #3 for an answer to the question.

The technologies described herein have at least the following exemplary advantages. By allowing users to interact with a mobile device by detecting touch events in the proximity of the mobile device, the device's interaction space is extended beyond the physical boundaries of the device. Further, the disclosed technologies expand the type of interactions that are supported. Typically, users interact with a mobile device via single- or multi-finger interactions (e.g., typing on a hard or soft keyboard, supplying single- or multi-finger gestures to a touchscreen), but the technologies described herein can detect whole-hand interactions, such as a user striking an open hand or pounding a first on a surface. Moreover, the disclosed technologies allow more users to simultaneously interact with a mobile device, or at least allow multiple users to more conveniently interact with a mobile device. As described above, multiple users can gather around a mobile device to play a game without having to crowd around the device to interact with the limited touch screen areas of smart phones and tablet computers. Furthermore, the disclosed technologies provide a low-cost solution to extending the interaction space of a device. Modifications to current mobile devices to implement technologies described herein may only need to be software modifications, as many current mobile devices already possess built-in accelerometers and gyroscopes that detect device movement. In addition, by being able to interact with the surface nearby the device, users do not have to worry about breaking the device when bringing their hand or other object down on the surface.

The technologies, techniques and embodiments described herein can be performed by any of a variety of computing devices, including mobile devices (such as smartphones, handheld computers, tablet computers, laptop computers, media players, portable gaming consoles, cameras and video recorders), non-mobile devices (such as desktop computers, servers, stationary gaming consoles, smart televisions) and embedded devices (such as devices incorporated into a vehicle). As used herein, the term "computing devices" includes computing systems and includes devices comprising multiple discrete physical components.

Figure 6:
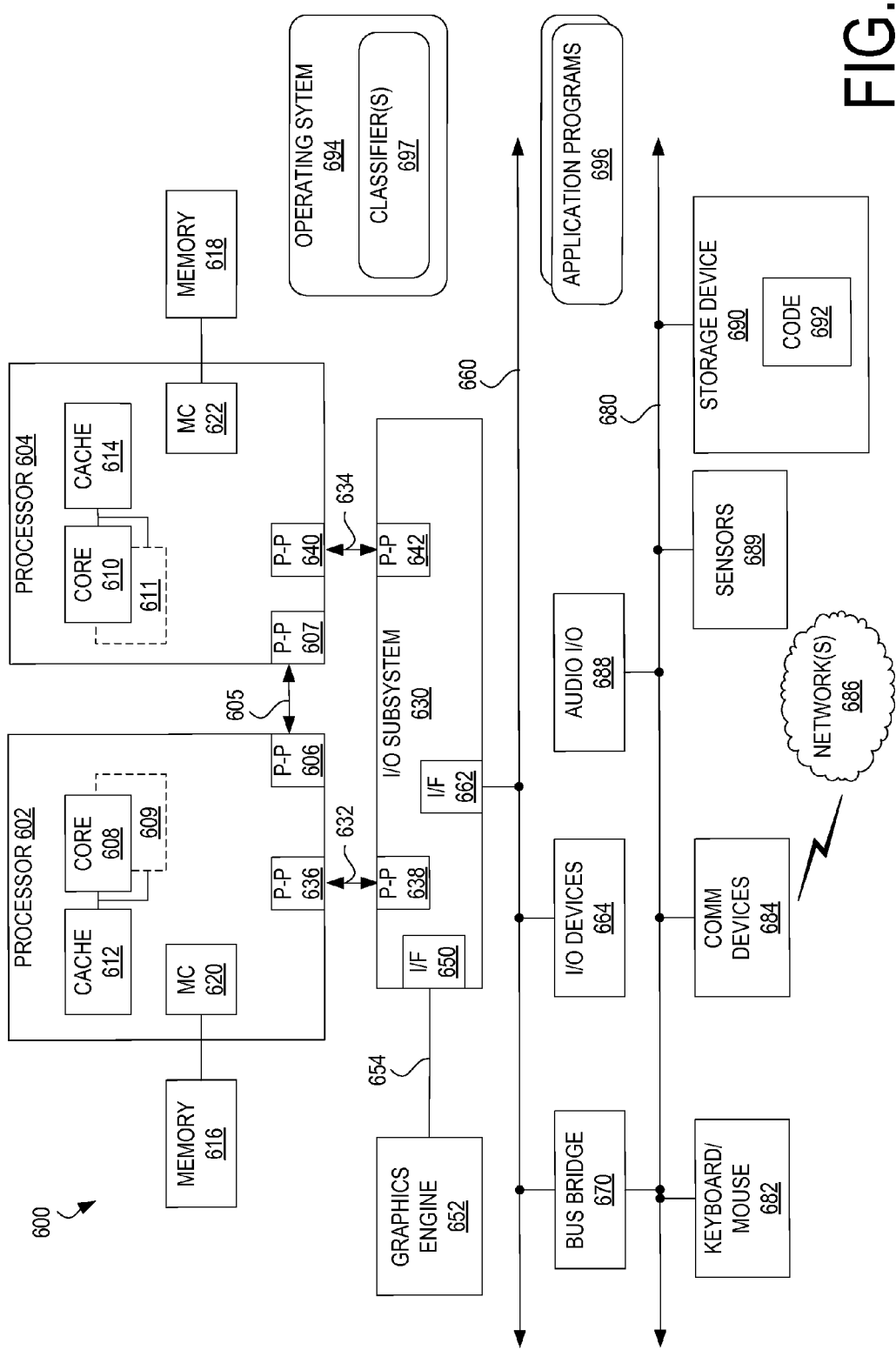
FIG. 6 is a block diagram of an exemplary computing device in which technologies described herein may be implemented.

FIG. 6 is a block diagram of an exemplary computing device in which technologies described herein may be implemented. Generally, components shown in FIG. 6 can communicate with other shown components, although not all connections are shown, for ease of illustration. The device 600 is a multiprocessor system comprising a first processor 602 and a second processor 604 and is illustrated as comprising point-to-point (P-P) interconnects. For example, a point-to-point (P-P) interface 606 of the processor 602 is coupled to a point-to-point interface 607 of the processor 604 via a point-to-point interconnection 605. It is to be understood that any or all of the point-to-point interconnects illustrated in FIG. 6 can be alternatively implemented as a multi-drop bus, and that any or all buses illustrated in FIG. 6 could be replaced by point-to-point interconnects.

As shown in FIG. 6, the processors 602 and 604 are multicore processors. Processor 602 comprises processor cores 608 and 609, and processor 604 comprises processor cores 610 and 611. Processor cores 608-611 can execute computer-executable instructions in a manner similar to that discussed below in connection with FIG. 7, or in other manners.

Processors 602 and 604 further comprise at least one shared cache memory 612 and 614, respectively. The shared caches 612 and 614 can store data (e.g., instructions) utilized by one or more components of the processor, such as the processor cores 608-609 and 610-611. The shared caches 612 and 614 can be part of a memory hierarchy for the device 600. For example, the shared cache 612 can locally store data that is also stored in a memory 616 to allow for faster access to the data by components of the processor 602. In some embodiments, the shared caches 612 and 614 can comprise multiple cache layers, such as level 1 (L1), level 2 (L2), level 3 (L3), level 4 (L4), and/or other caches or cache layers, such as a last level cache (LLC).

Although the device 600 is shown with two processors, the device 600 can comprise any number of processors. Further, a processor can comprise any number of processor cores. A processor can take various forms such as a central processing unit, a controller, a graphics processor, an accelerator (such as a graphics accelerator or digital signal processor (DSP)) or a field programmable gate array (FPGA). A processor in a device can be the same as or different from other processors in the device. In some embodiments, the device 600 can comprise one or more processors that are heterogeneous or asymmetric to a first processor, accelerator, FPGA, or any other processor. There can be a variety of differences between the processing elements in a system in terms of a spectrum of metrics of merit including architectural, microarchitectural, thermal, power consumption characteristics and the like. These differences can effectively manifest themselves as asymmetry and heterogeneity amongst the processors in a system. In some embodiments, the processors 602 and 604 reside in the same die package.

Processors 602 and 604 further comprise memory controller logic (MC) 620 and 622. As shown in FIG. 6, MCs 620 and 622 control memories 616 and 618 coupled to the processors 602 and 604, respectively. The memories 616 and 618 can comprise various types of memories, such as volatile memory (e.g., dynamic random access memories (DRAM), static random access memory (SRAM)) or non-volatile memory (e.g., flash memory). While MCs 620 and 622 are illustrated as being integrated into the processors 602 and 604, in alternative embodiments, the MCs can be logic external to a processor, and can comprise one or more layers of a memory hierarchy.

Processors 602 and 604 are coupled to an Input/Output (I/O) subsystem 630 via P-P interconnections 632 and 634. The point-to-point interconnection 632 connects a point-to-point interface 636 of the processor 602 with a point-to-point interface 638 of the I/O subsystem 630, and the point-to-point interconnection 634 connects a point-to-point interface 640 of the processor 604 with a point-to-point interface 642 of the I/O subsystem 630. Input/Output subsystem 630 further includes an interface 650 to couple I/O subsystem 630 to a graphics engine 652, which can be a high-performance graphics engine. The I/O subsystem 630 and the graphics engine 652 are coupled via a bus 654. Alternately, the bus 654 could be a point-to-point interconnection.

Input/Output subsystem 630 is further coupled to a first bus 660 via an interface 662. The first bus 660 can be a Peripheral Component Interconnect (PCI) bus, a PCI Express bus, another third generation I/O interconnection bus or any other type of bus.

Various I/O devices 664 can be coupled to the first bus 660. A bus bridge 670 can couple the first bus 660 to a second bus 680. In some embodiments, the second bus 680 can be a low pin count (LPC) bus. Various devices can be coupled to the second bus 680 including, for example, a keyboard/mouse 682, audio I/O devices 688 and a storage device 690, such as a hard disk drive, solid-state drive or other storage device for storing computer-executable instructions (code) 692. The code 692 can comprise computer-executable instructions for performing technologies described herein. Additional components that can be coupled to the second bus 680 include communication device(s) 684, which can provide for communication between the device 600 and one or more wired or wireless networks 686 (e.g. Wi-Fi, cellular or satellite networks) via one or more wired or wireless communication links (e.g., wire, cable, Ethernet connection, radio-frequency (RF) channel, infrared channel, Wi-Fi channel) using one or more communication standards (e.g., IEEE 802.11 standard and its supplements). In addition, the device 600 can comprise one or more sensors 689 that can detect motion of the device 600, such as accelerometers or a gyroscope.

The device 600 can comprise removable memory such as flash memory cards (e.g., SD (Secure Digital) cards), memory sticks, Subscriber Identity Module (SIM) cards). The memory in device 600 (including caches 612 and 614, memories 616 and 618 and storage device 690) can store data and/or computer-executable instructions for executing an operating system 694 and application programs 696. Example data includes web pages, text messages, images, sound files, video data, classifier training data or other data sets to be sent to and/or received from one or more network servers or other devices by the device 600 via one or more wired or wireless networks, or for use by the device 600. The device 600 can also have access to external memory (not shown) such as external hard drives or cloud-based storage.

The operating system 694 can control the allocation and usage of the components illustrated in FIG. 6 and support one or more application programs 696. The operating system 694 can comprise components that collect readings from one or more sensors, determine whether the sensor readings indicate a touch event in the area surrounding the device, determine feature vectors for touch events, determine touch event locations, and one or more classifiers 697 for providing the locations to the application programs 696. Various classifiers can be included in the 600 to account for, for example, various types of surface and various sensor configurations. For instance, if a mobile device 600 comprises two accelerometers, a first classifier could be used to provide a touch event location for data collected from a single accelerometer, and a second classifier could provide a location for data collected at both accelerometers.

The application programs 696 can include common mobile computing device applications (e.g., email applications, calendars, contact managers, web browsers, messaging applications) as well as other computing applications, such as application that utilize the detection and locations of touch events that occur in the area surrounding the device 600.

The device 600 can support various input devices, such as a touch screen, microphone, camera, physical keyboard, and trackball, and one or more output devices, such as a speaker and a display. Other possible input and output devices include piezoelectric and other haptic I/O devices. Any of the input or output devices can be internal to, external to or removably attachable with the device 600. External input and output devices can communicate with the device 600 via wired or wireless connections.

In addition, the computing device 600 can provide one or more natural user interfaces (NUIs). For example, the operating system 694 or applications 696 can comprise speech recognition logic as part of a voice user interface that allows a user to operate the device 600 via voice commands. Further, the device 600 can comprise input devices and logic that allows a user to interact with the device 600 via a body, hand or face gestures. For example, a user's hand gestures can be detected and interpreted to provide input to a gaming application.

The device 600 can further comprise one or more communication components 684. The components 684 can comprise wireless communication components coupled to one or more antennas to support communication between the system 600 and external devices. The wireless communication components can support various wireless communication protocols and technologies such as Near Field Communication (NFC), Wi-Fi, Bluetooth, 4G Long Term Evolution (LTE), Code Division Multiplexing Access (CDMA), Universal Mobile Telecommunication System (UMTS) and Global System for Mobile Telecommunication (GSM). In addition, the wireless modems can support communication with one or more cellular networks for data and voice communications within a single cellular network, between cellular networks, or between the mobile computing device and a public switched telephone network (PSTN).

The device 600 can further include at least one input/output port (which can be, for example, a USB, IEEE 1394

(FireWire), Ethernet and/or RS-232 port) comprising physical connectors; a power supply; a proximity sensor; compass; and a satellite navigation system receiver, such as a GPS receiver. A GPS receiver can be coupled to a GPS antenna. The device 600 can further include one or more additional antennas coupled to one or more additional receivers, transmitters and/or transceivers to enable additional functions.

It is to be understood that FIG. 6 illustrates only one exemplary computing device architecture. Computing devices based on alternative architectures can be used to implement technologies described herein. For example, instead of the processors 602 and 604, and the graphics engine 652 being located on discrete integrated circuits, a computing device can comprise a SoC (system-on-a-chip) integrated circuit incorporating multiple processors, a graphics engine and additional components. Further, a computing device can connect elements via bus or point-to-point configurations different from that shown in FIG. 6. Moreover, the illustrated components in FIG. 6 are not required or all-inclusive, as shown components can be removed and other components added in alternative embodiments.

Figure 7:
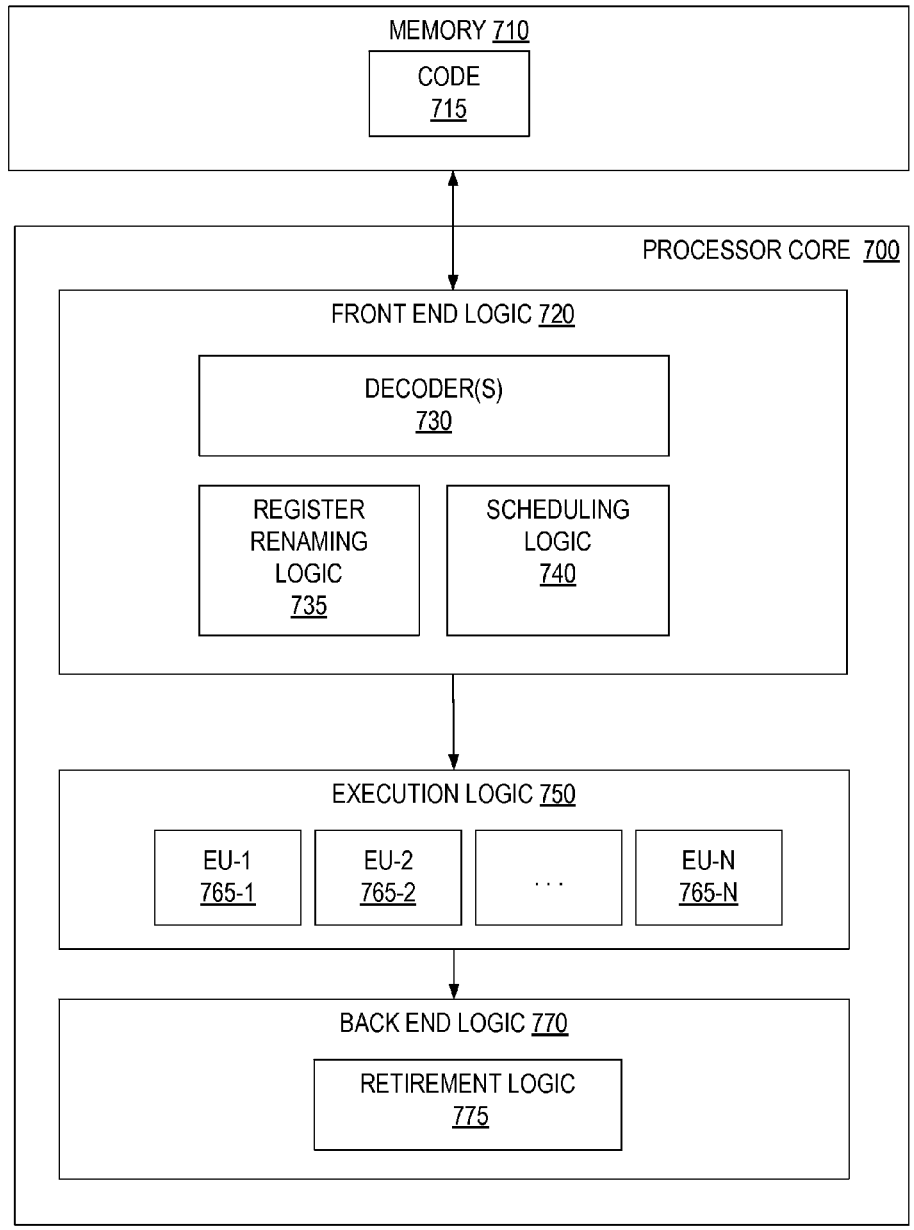
FIG. 7 is a block diagram of an exemplary processor core that can execute computer-executable instructions as part of implementing technologies described herein.

FIG. 7 is a block diagram of an exemplary processor core 700 to execute computer-executable instructions as part of implementing technologies described herein. The processor core 700 can be a core for any type of processor, such as a microprocessor, an embedded processor, a digital signal processor (DSP) or a network processor. The processor core 700 can be a single-threaded core or a multithreaded core in that it may include more than one hardware thread context (or "logical processor") per core.

FIG. 7 also illustrates a memory 710 coupled to the processor 700. The memory 710 can be any memory described herein or any other memory known to those of skill in the art. The memory 710 can store computer-executable instruction 715 (code) executable by the processor core 700.

The processor core comprises front-end logic 720 that receives instructions from the memory 710. An instruction can be processed by one or more decoders 730. The decoder 730 can generate as its output a micro operation such as a fixed width micro operation in a predefined format, or generate other instructions, microinstructions, or control signals, which reflect the original code instruction. The front-end logic 720 further comprises register renaming logic 735 and scheduling logic 740, which generally allocate resources and queues operations corresponding to converting an instruction for execution.

The processor core 700 further comprises execution logic 750, which comprises one or more execution units (EUs) 765-1 through 765-N. Some processor core embodiments can include a number of execution units dedicated to specific functions or sets of functions. Other embodiments can include only one execution unit or one execution unit that can perform a particular function. The execution logic 750 performs the operations specified by code instructions. After completion of execution of the operations specified by the code instructions, back-end logic 770 retires instructions using retirement logic 775. In some embodiments, the processor core 700 allows out of order execution but requires in-order retirement of instructions. Retirement logic 770 can take a variety of forms as known to those of skill in the art (e.g., re-order buffers or the like).

The processor core 700 is transformed during execution of instructions, at least in terms of the output generated by the decoder 730, hardware registers and tables utilized by the register renaming logic 735, and any registers (not shown) modified by the execution logic 750. Although not illustrated in FIG. 7, a processor can include other elements on an integrated chip with the processor core 700. For example, a processor may include additional elements such as memory control logic, one or more graphics engines, I/O control logic and/or one or more caches.

Referring back to FIG. 6, the network 686 can provide various cloud-based services that can be used to implement technologies described herein. For example, the training examples for training a classifier can be provided by a cloud-based service for common surfaces. In some embodiments, touch feature vector generation can be performed locally at a mobile device and then sent to a cloud-based service for location determination. That is, the classifiers could be implemented remotely.

Any of the disclosed methods can be implemented as computer-executable instructions or a computer program product. Such instructions can cause a computer to perform any of the disclosed methods. Generally, as used herein, the term "computer" refers to any computing device or system described or mentioned herein, or any other computing device. Thus, the term "computer-executable instruction" refers to instructions that can be executed by any computing device described or mentioned herein, or any other computing device.

The computer-executable instructions or computer program products as well as any data created and used during implementation of the disclosed technologies can be stored on one or more tangible computer-readable storage media, such as optical media discs (e.g., DVDs, CDs), volatile memory components (e.g., DRAM, SRAM), or non-volatile memory components (e.g., flash memory, disk drives). Computer-readable storage media can be contained in computer-readable storage devices such as solid-state drives, USB flash drives, and memory modules. Alternatively, the computer-executable instructions may be performed by specific hardware components that contain hardwired logic for performing all or a portion of disclosed methods, or by any combination of computer-readable storage media and hardware components.

The computer-executable instructions can be part of, for example, a dedicated software application or a software application that is accessed via a web browser or other software application (such as a remote computing application). Such software can be executed, for example, on a single computing device or in a network environment using one or more network computers. Further, it is to be understood that the disclosed technology is not limited to any specific computer language or program. For instance, the disclosed technologies can be implemented by software written in C++, Java, Perl, JavaScript, Adobe Flash, or any other suitable programming language. Likewise, the disclosed technologies are not limited to any particular computer or type of hardware. Certain details of suitable computers and hardware are known and need not be set forth in detail in this disclosure.

Furthermore, any of the software-based embodiments (comprising, for example, computer-executable instructions for causing a computer to perform any of the disclosed methods) can be uploaded, downloaded or remotely accessed through a suitable communication means. Such suitable communication means include, for example, the Internet, the World Wide Web, an intranet, cable (including fiber optic cable), magnetic communications, electromagnetic communications (including RF, microwave, and infrared communications), electronic communications, or other such communication means.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

The disclosed methods, apparatuses and systems are not to be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

Theories of operation, scientific principles or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

Although the operations of some of the disclosed methods are described in a particular, sequential order for convenient presentation, it is to be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

The follow examples pertain to additional embodiments of technologies disclosed herein.

Example 1

A mobile device comprising one or more sensors; one or more classifiers to determine a location of an extra-device touch event occurring within a proximity of the mobile device based at least in part on readings of the one or more sensors; and a reporting module to report the location of the extra-device touch event to an application executing on the mobile device.

Example 2

The mobile device of Example 1, wherein the location of the extra-device touch event comprises a direction relative to the mobile device.

Example 3

The mobile device of Example 1, wherein the location of the extra-device touch event comprises a distance from to the mobile device.

Example 4

The mobile device of Example 1, wherein the one or more sensors comprise at least one accelerometer.

Example 5

The mobile device of Example 1, wherein the one or more sensors comprise a gyroscope.

Example 6

The mobile device of Example 1, wherein the application is capable of performing an action based at least in part on an extra-device touch event location provided to the application by the reporting module.

Example 7

The mobile device of Example 6, wherein the application is further capable of performing a first action if the extra-device touch event location is within a first region of the proximity of the mobile device and a second action if the extra-device touch event location is within a second region of the proximity of the mobile device, the first action being different than the second action.

Example 8

The mobile device of Example 6, further comprising an extra-device touch event determination module to determine timing information of the extra-device touch event, the reporting module to further report the timing information of the extra-device touch event to the application, the action to be performed by the first application being further based at least in part on the timing information of the extra-device touch event.

Example 9

The mobile device of Example 6, at least one of the classifiers to further determine an intensity of the extra-device touch event, the reporting module to further report the intensity of the extra-device touch event to the application, the application being capable of performing an action based at least in part on the extra-device touch event location and the intensity of the extra-device touch event provided to the application by the reporting module.

Example 10

The mobile device of Example 1, at least one of the one or more classifiers to further determine a profile of an object used to create the extra-device touch event, the reporting module to further report the profile of the object to the application, the application being capable of performing an action based at least in part on the extra-device touch event location and the profile of the object provided to the application by the reporting module.

Example 11

The mobile device of Example 1, further comprising: a vector generation module to generate an extra-device touch event feature vector based on the readings of the one or more sensors for use by the one or more classifiers to determine the location of the extra-device touch event; and an extra-device touch event determination module to determine whether the readings of the one or more sensors indicate the occurrence of an extra-device touch event.

Example 12

The mobile device of Example 1, further comprising: a vector generation module to generate an extra-device touch event feature vector based on the readings of the one or more sensors for use by the one or more classifiers to determine the location of the extra-device touch event and an intensity of the extra-device touch event; and an extra-device touch event determination module to determine whether the readings of the one or more sensors indicate the occurrence of an extra-device touch event.

Example 13

The mobile device of Example 1, further comprising: a vector generation module to generate an extra-device touch event feature vector based on the readings of the one or more sensors for use by the one or more classifiers to determine the location of the extra-device touch event and a profile of an object used to create the extra-device touch event; and an extra-device touch event determination module to determine whether the readings of the one or more sensors indicate the occurrence of an extra-device touch event.

Example 14

A method of detecting and responding to an extra-device touch event, the method comprising: determining a location of an extra-device touch event occurring in the proximity of a mobile device based on movement of the mobile device as detected by one or more mobile device sensors; determining an action to perform based at least in part on the location; and performing the action at the mobile device.

Example 15

The method of Example 14, wherein the location comprises a direction relative to the mobile device.

Example 16

The method of Example 14, wherein the location comprises a distance from the mobile device.

Example 17

The method of Example 14, further comprising determining timing information for the extra-device touch event, wherein the determining an action to perform is further based on the timing information.

Example 18

The method of Example 14, further comprising determining timing information for the extra-device touch event and timing information for one or more additional extra-device touch events occurring in the proximity of the mobile device, wherein the determining an action to perform is further based on which of the extra-device touch event and the one or more additional extra-device touch events occurred earliest, according at least in part to the timing information for the extra-device touch event and the timing information for the one or more additional extra-device touch events.

Example 19

The method of Example 14, wherein the action to perform is one of a plurality of actions, the plurality of actions comprising a first action to be performed if the location is within a first region of the proximity of the mobile device and a second action to be performed if the extra-device touch event is determined to be within a second region of the proximity to the mobile device, the first event being different than the second event.

Example 20

The method of Example 14, further comprising determining an intensity of the extra-device touch event, wherein the action to be performed is further based on the intensity of the extra-device touch event.

Example 21

The method of Example 14, further comprising determining a profile of an object used to create the extra-device touch event, wherein the action to be performed is further based on the profile of the object.

Example 22

The method of Example 14, wherein the determining the location comprises: reading one or more sensor values from the one or more mobile device sensors; determining that the one or more sensor values indicate the occurrence of an extra-device touch event; and generating an extra-device touch event feature vector from the one or more sensor values; wherein the determining the location comprises providing the extra-device touch event feature vector to a classifier.\

Example 23

The method of Example 22, wherein the determining that the one or more sensor values indicate the occurrence of an extra-device touch event comprises determining that at least one of the one or more mobile sensor values exceeds an extra-device touch event threshold.

Example 24

The method of Example 22, wherein the classifier is one of a plurality of classifiers, the method further comprising selecting the classifier from the plurality of classifiers based on a surface type of the proximity of the mobile device.

Example 25

The method of Example 24, wherein the surface type is determined based at least in part on an image of a surface of the proximity of the mobile device Example 26

The method of Example 24, wherein the surface type is determined based at least in part on training extra-device touch event feature vectors generated in response to instructing a user to perform one or more specific taps on the table, comparing the training extra-device touch event feature vectors to training vectors corresponding to different stored classifiers.

Example 27

One or more computer-readable storage media implementing any one of the methods of Example 14-26.

Example 28

An apparatus comprising a means to perform any one of the methods of Example 14-26.

Example 29

One or more computer-readable media having instructions stored thereon for causing a mobile device to perform a method, the method comprising: determining a location of an extra-device touch event occurring in the proximity of a mobile device based on movement of the mobile device as detected by one or more mobile device sensors; determining an action to perform based at least in part on the location; and performing the action at the mobile device.

Example 30

The one or more computer-readable media of Example 29, wherein the location comprises a direction relative to the mobile device.

Example 31

The one or more computer-readable media of Example 29, wherein the location comprises a distance from the mobile device.

Example 32

The one or more computer-readable media of Example 29, further comprising determining timing information for the extra-device touch event, wherein the determining an action to perform is further based on the timing information.

Example 33

The one or more computer-readable media of Example 29, further comprising determining timing information for the extra-device touch event and timing information for one or more additional extra-device touch events occurring in the proximity of the mobile device, wherein the determining an action to perform is further based on which of the extra-device touch event and the one or more additional extra-device touch events occurred earliest, according at least in part to the timing information for the extra-device touch event and the timing information for the one or more additional extra-device touch events.

Example 34

The one or more computer-readable media of Example 29, wherein the action to perform is one of a plurality of actions, the plurality of actions comprising a first action to be performed if the location is within a first region of the proximity of the mobile device and a second action to be performed if the extra-device touch event is determined to be within a second region of the proximity to the mobile device, the first event being different than the second event.

Example 35

The one or more computer-readable media of Example 29, further comprising determining an intensity of the extra-device touch event, wherein the action to be performed is further based on the intensity of the extra-device touch event.

Example 36

The one or more computer-readable media of Example 29, further comprising determining a profile of an object used to create the extra-device touch event, wherein the action to be performed is further based on the profile of the object.

Example 37

The one or more computer-readable media of Example 29, wherein the determining the location comprises: reading one or more sensor values from the one or more mobile device sensors; determining that the one or more sensor values indicate the occurrence of an extra-device touch event; and generating an extra-device touch event feature vector from the one or more sensor values; wherein the determining the location comprises providing the extra-device touch event feature vector to a classifier.

Example 38

The one or more computer-readable media of Example 37, wherein the determining that the one or more sensor values indicate the occurrence of an extra-device touch event comprises determining that at least one of the one or more mobile sensor values exceeds an extra-device touch event threshold.

Example 39

The one or more computer-readable media of Example 37, wherein the classifier is one of a plurality of classifiers, the method further comprising selecting the classifier from the plurality of classifiers based on a surface type of the proximity of the mobile device.

Example 40

The one or more computer-readable media of Example 39, wherein the surface type is determined based at least in part on an image of a surface of the proximity of the mobile device.

Example 41

An apparatus comprising: a means for determining a location of an extra-device touch event occurring in the proximity of a mobile device based on movement of the mobile device as detected by one or more mobile device sensors; a means for determining an action to perform based at least in part on the location; and a means for performing the action at the mobile device.

Example 42

The apparatus of Example 41, further comprising a means for determining timing information for the extra-device touch event and timing information for one or more additional extra-device touch events occurring in the proximity of the mobile device, wherein the means for determining an action to perform is further based on which of the extra-device touch event and the one or more additional extra-device touch events occurred earliest, according at least in part to the timing information for the extra-device touch event and the timing information for the one or more additional extra-device touch events.

Example 43

The apparatus of Example 41, wherein the means for determining the extra-device touch event location comprises: a means for reading one or more sensor values from the one or more mobile device sensors; a means for determining that the one or more sensor values indicate the occurrence of an extra-device touch event; and a means for generating an extra-device touch event feature vector from the one or more sensor values; wherein the determining the location comprises providing the extra-device touch event feature vector to a classifier.

I claim:

1. A mobile device comprising:
   one or more sensors to detect movement of the mobile device caused by an extra-device touch event on a surface on which the mobile device is placed and within a proximity of the mobile device, wherein the one or more sensors comprise one or more accelerometers or gyroscopes;
   one or more classifiers to determine a location of the extra-device touch event based at least in part on readings of the one or more sensors; and
   a reporting module to report the location of the extra-device touch event to an application executing on the mobile device.

2. The mobile device is claim 1, wherein the location of the extra-device touch event comprises a direction relative to the mobile device.

3. The mobile device of claim 1, wherein the application is capable of performing an action based at least in part on an extra-device touch event location provided to the application by the reporting module.

4. The mobile device of claim 3, wherein the application is further capable of performing a first action if the extra-device touch event location is within a first region of the proximity of the mobile device and a second action if the extra-device touch event location is within a second region of the proximity of the mobile device, the first action being different than the second action.

5. The mobile device of claim 3, further comprising an extra-device touch event determination module to determine timing information of the extra-device touch event, the reporting module to further report the timing information of the extra-device touch event to the application, the action to be performed by the application being further based at least in part on the timing information of the extra-device touch event.

6. The mobile device of claim 3, at least one of the classifiers to further determine an intensity of the extra-device touch event, the reporting module to further report the intensity of the extra-device touch event to the application, the application being capable of performing an action based at least in part on the extra-device touch event location and the intensity of the extra-device touch event provided to the application by the reporting module.

7. The mobile device of claim 1, further comprising:
   a vector generation module to generate an extra-device touch event feature vector based on the readings of the one or more sensors for use by the one or more classifiers to determine the location of the extra-device touch event; and
   an extra-device touch event determination module to determine whether the readings of the one or more sensors indicate the occurrence of an extra-device touch event.

8. The mobile device of claim 1, further comprising:
   a vector generation module to generate an extra-device touch event feature vector based on the readings of the one or more sensors for use by the one or more classifiers to determine the location of the extra-device touch event and an intensity of the extra-device touch event; and
   an extra-device touch event determination module to determine whether the readings of the one or more sensors indicate the occurrence of an extra-device touch event.

9. A method of detecting and responding to an extra-device touch event, the method comprising:
   determining a location of an extra-device touch event on a surface on which a mobile device is placed and occurring in the proximity of the mobile device based on movement of the mobile device caused by the extra-device touch event and as detected by one or more mobile device sensors, wherein the one or more mobile device sensors comprise one or more accelerometers or gyroscopes;
   determining an action to perform based at least in part on the location; and
   performing the action at the mobile device.

10. The method of claim 9, further comprising determining timing information for the extra-device touch event, wherein the determining an action to perform is further based on the timing information.

11. The method of claim 9, further comprising determining timing information for the extra-device touch event and timing information for one or more additional extra-device touch events occurring in the proximity of the mobile device, wherein the determining an action to perform is further based on which of the extra-device touch event and the one or more additional extra-device touch events occurred earliest, according at least in part to the timing information for the extra-device touch event and the timing information for the one or more additional extra-device touch events.

12. The method of claim 9, wherein the determining the location comprises:
   reading one or more sensor values from the one or more mobile device sensors;
   determining that the one or more sensor values indicate the occurrence of an extra-device touch event; and
   generating an extra-device touch event feature vector from the one or more sensor values;
   wherein the determining the location comprises providing the extra-device touch event feature vector to a classifier.

13. One or more non-transitory computer-readable media having instructions stored thereon for causing a mobile device to perform a method, the method comprising:
   determining a location of an extra-device touch event on a surface on which the mobile device is placed and occurring in the proximity of the mobile device based on movement of the mobile device caused by the extra-device touch event and as detected by one or more mobile device sensors, wherein the one or more mobile device sensors comprise one or more accelerometers or gyroscopes;
   determining an action to perform based at least in part on the location; and performing the action at the mobile device.

14. The one or more non-transitory computer-readable media of claim 13, wherein the location comprises a direction relative to the mobile device.

15. The one or more non-transitory computer-readable media of claim 13, further comprising determining timing information for the extra-device touch event, wherein the determining an action to perform is further based on the timing information.

16. The one or more non-transitory computer-readable media of claim 13, further comprising determining timing information for the extra-device touch event and timing information for one or more additional extra-device touch events occurring in the proximity of the mobile device, wherein the determining an action to perform is further based on which of the extra-device touch event and the one or more additional extra-device touch events occurred earliest, according at least in part to the timing information for the extra-device touch event and the timing information for the one or more additional extra-device touch events.

17. The one or more non-transitory computer-readable media of claim 13, wherein the action to perform is one of a plurality of actions, the plurality of actions comprising a first action to be performed if the location is within a first region of the proximity of the mobile device and a second action to be performed if the extra-device touch event is determined to be within a second region of the proximity to the mobile device, the first event being different than the second event.

18. The one or more non-transitory computer-readable media of claim 13, further comprising determining an intensity of the extra-device touch event, wherein the action to be performed is further based on the intensity of the extra-device touch event.

19. The one or more non-transitory computer-readable media of claim 13, further comprising determining a profile of an object used to create the extra-device touch event, wherein the action to be performed is further based on the profile of the object.

20. The one or more non-transitory computer-readable media of claim 13, wherein the determining the location comprises:
    reading one or more sensor values from the one or more mobile device sensors;
    determining that the one or more sensor values indicate the occurrence of an extra-device touch event; and
    generating an extra-device touch event feature vector from the one or more sensor values;
    wherein the determining the location comprises providing the extra-device touch event feature vector to a classifier.

21. The one or more non-transitory computer-readable media of claim 20, wherein the determining that the one or more sensor values indicate the occurrence of an extra-device touch event comprises determining that at least one of the one or more mobile sensor values exceeds an extra-device touch event threshold.

22. The one or more non-transitory computer-readable media of claim 20, wherein the classifier is one of a plurality of classifiers, the method further comprising selecting the classifier from the plurality of classifiers based on a surface type of the proximity of the mobile device.

23. The one or more non-transitory computer-readable media of claim 22, wherein the surface type is determined based at least in part on an image of a surface of the proximity of the mobile device.

24. An apparatus comprising:
    a means for determining a location of an extra-device touch event on a surface on which a mobile device is placed and occurring in the proximity of the mobile device based on movement of the mobile device caused by the extra-device touch event and as detected by one or more mobile device sensors, wherein the one or more mobile device sensors comprise one or more accelerometers or gyroscopes;
    a means for determining an action to perform based at least in part on the location; and
    a means for performing the action at the mobile device.

25. The apparatus of claim 24, further comprising a means for determining timing information for the extra-device touch event and timing information for one or more additional extra-device touch events occurring in the proximity of the mobile device, wherein the means for determining an action to perform is further based on which of the extra-device touch event and the one or more additional extra-device touch events occurred earliest, according at least in part to the timing information for the extra-device touch event and the timing information for the one or more additional extra-device touch events.

* * * * *